United States Patent [19]
Dawson

[11] 3,787,925
[45] Jan. 29, 1974

[54] PLASTIC WHEEL ASSEMBLY FOR OVERHEAD CONVEYORS

[75] Inventor: Clarence G. Dawson, Dallas, Tex.
[73] Assignee: FEI, Inc., Dallas, Tex.
[22] Filed: Dec. 7, 1972
[21] Appl. No.: 312,876

[52] U.S. Cl. .................................................. 16/107
[51] Int. Cl. ............................................. A47h 15/00
[58] Field of Search ... 16/107, 45, 46, 102, 106, 91, 16/97, 98; 301/5.7, 5; 308/36.1, 20, 16

[56] References Cited
UNITED STATES PATENTS

| | | | |
|---|---|---|---|
| 1,566,609 | 12/1925 | Larsen | 16/107 UX |
| 3,451,095 | 6/1969 | Kiefer | 16/107 |
| 3,492,055 | 1/1970 | Frankland | 16/45 X |
| 3,602,150 | 8/1971 | Frost et al. | 16/98 X |
| 3,708,827 | 1/1973 | Foltz | 16/107 X |

*Primary Examiner*—Donald A. Griffin

[57] ABSTRACT

The specification discloses a wheel assembly for attachment to an overhead conveyor bracket which includes a bolt having an outwardly conical head for being received at one end by the conveyor bracket. The assembly includes a ferrule comprising a cylindrical portion through which the bolt extends and an outwardly flared conical end portion for receiving the flared bolt head. A conveyor wheel having a generally cylindrical exterior and a central opening therethrough is dimensioned to receive the ferrule. The central opening through the wheel communicates with a conical portion for receiving the conical end portion of the ferrule. The conveyor wheel is constructed from a self-lubricating plastic having high abrasion resistance and a low coefficient of sliding friction. In the preferred embodiment, the wheel is comprised of an ultra-high molecular weight polymer having a coefficient of friction of about 0.11 and a specific gravity of about 0.945.

8 Claims, 5 Drawing Figures

PATENTED JAN 29 1974  3,787,925

PLASTIC WHEEL ASSEMBLY FOR OVERHEAD CONVEYORS

1. Field Of The Invention

This application relates to conveyor wheels, and more particularly relates to plastic wheel assemblies for use with overhead conveyors.

2. The Prior Art

Overhead conveyors are commonly used in a variety of applications in manufacturing and fabrication plants and in food processing plants such as those designed for processing fowl. Generally, the overhead conveyors comprise several wheels which support conveyor brackets and run along an overhead beam. Shackles or the like are connected to the conveyor brackets for supporting articles to be processed such as animal carcasses. The wheels are rolled along the overhead beam by motor-driven chains or other suitable drive mechanisms.

Conventionally, such overhead conveyor wheels are constructed from metal and are supported by ball bearings. One disadvantage of prior art metal wheels is that they are subject to rust and the bearings generally require periodic lubrication. Moreover, many prior overhead conveyor wheels tend to wear severely at the bearing location which causes them to bind when making turns or when changing elevation. A need thus exists for an overhead conveyor wheel which is not subject to rust, does not need periodic lubrication, and is not subject to binding or severe wear problems.

SUMMARY OF THE INVENTION

In accordance with the present invention, a wheel assembly includes a shaft and a ferrule having a hollow cylindrical section, for receiving the shaft, and a conical outwardly flared end section. A wheel is constructed from self-lubricating thermoplastic material and includes a central opening for receiving the ferrule. The central wheel opening includes, at one end, a conical portion for generally mating with the flared end section of the ferrule.

In accordance with a more specific aspect of the invention, a wheel assembly is provided for attachment to an overhead conveyor bracket and includes a bolt, having an outwardly flared conical end, for being received by the conveyor bracket. The assembly includes a ferrule having a cylindrical portion through which the bolt extends and an outwardly flared conical end portion for receiving the flared bolt end. A conveyor wheel having a generally cylindrical exterior includes a central opening therethrough which is dimensioned for receiving the ferrule. The central wheel opening communicates with a conical portion for receiving the conical end portion of the ferrule. The wheel is constructed from self-lubricating plastic having high abrasion resistance and a low coefficient of sliding friction.

DESCRIPTION OF THE DRAWINGS

For a more complete understanding of the present invention and for further objects and advantages thereof, reference is now made to the following description taken in conjunction with the accompanying drawing, in which.

DESCRIPTION OF THE PREFERRED EMBODIMENT

Figure 1:
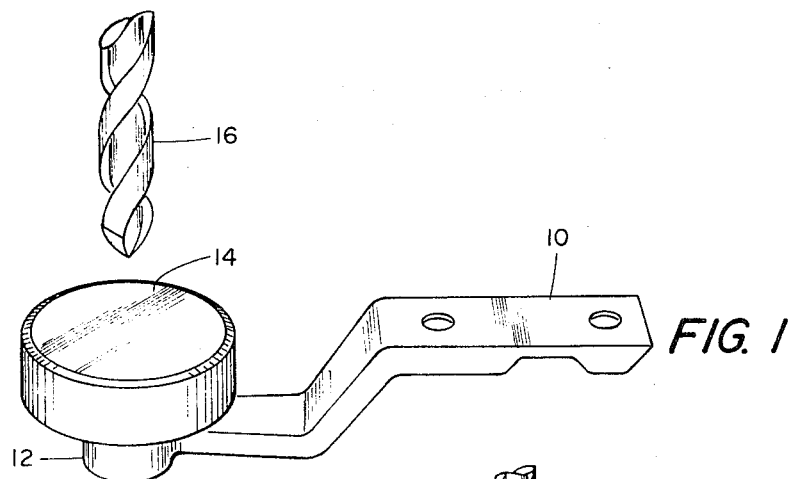
FIG. 1 is a view illustrating the first step in removing the steel wheel from a conventional overhead conveyor bracket.

FIG. 1 illustrates a conventional overhead conveyor bracket 10 which is connected at one end 12 to a conventional steel wheel 14. In use, the wheel 14 normally rides along an overhead conveyor beam and the bracket 10 depends downwardly therefrom for supporting a shackle or the like. A drill bit 16 is used to drill a hole through the steel wheel 14 so that the wheel 14 may be removed from the bracket 10.

Figure 2:
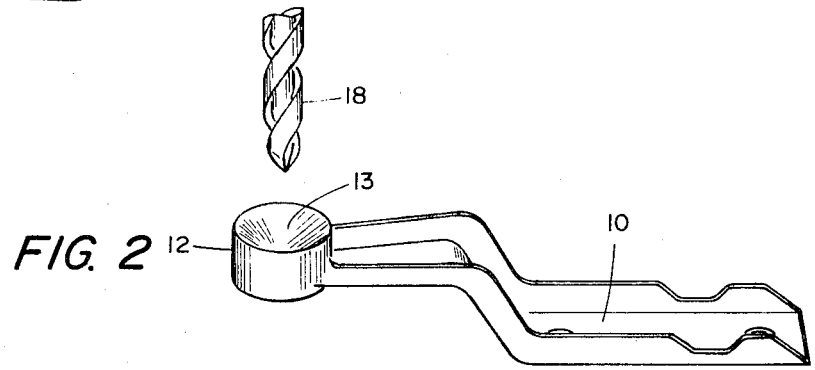
FIG. 2 is a view illustrating the step of removing the grease fitting from the conventional overhead bracket shown in FIG. 1.

Referring to FIG. 2, the grease fitting for the steel wheel bearing (not shown) is removed from the end portion 12 and an aperture 13 is formed therein with a drill bit 18. The aperture 13 is utilized to connect the wheel assembly of the present invention to the bracket 10.

Figure 3:
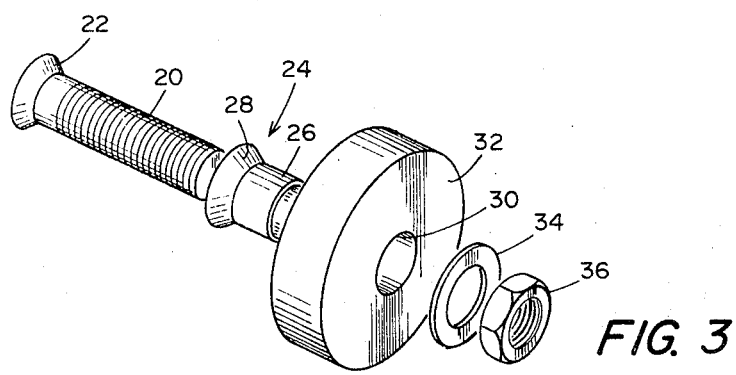
FIG. 3 is an exploded view of a conveyor wheel constructed in accordance with the present invention.
Figure 4:
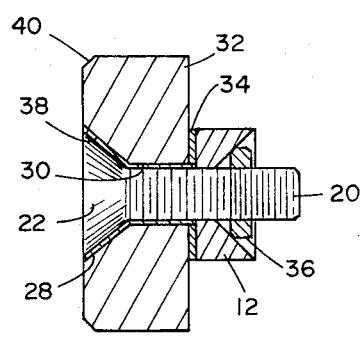
FIG. 4 is a cross-section view of the wheel shown in FIG. 3 assembled with the overhead conveyor bracket shown in FIG. 1.
Figure 5:
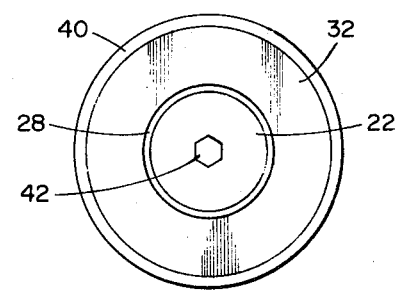
FIG. 5 is a front view of the assembled wheel shown in FIG. 4.

FIGS. 3-5 illustrate the parts and construction of the wheel assembly of the present invention. The assembly includes a threaded bolt 20 having an outwardly flared conical head 22. A ferrule 24 includes a cylindrical portion 26 and an outwardly flared conical end portion 28. The cylindrical portion 26 has an internal diameter sufficiently large to receive the bolt 20 and the flared conical end portion 28 is adapted to receive the head 22 of the bolt 20, in a manner to be subsequently described. The external diameter of the ferrule cylindrical portion 26 is sized to be received within an aperture 30 of a plastic wheel 32. A flat washer 34 receives the end of the bolt 20 and a conventional nut 36 is utilized to tightly hold the bolt 20 to the end of the bracket 10.

FIG. 4 illustrates a cross-sectional view of the wheel after connection to the end 12 of the overhead conveyor bracket 10. As can be seen, the head 22 of the bolt 20 is received by the outwardly flared conical end portion 28 of the ferrule 24. Likewise, the end portion 28 of the ferrule is received by a conical portion 38 of the aperture 30 formed through wheel 32. the washer 34 is disposed between the face of the wheel 32 and the end portion 12, and the nut 36 is utilized to tightly connect the wheel assembly to the end portion 12 of the overhead bracket 10.

The ferrule 24 acts as a bearing between the bolt 20 and the wheel 32. The mating conical shape of the ferrule 24 and the bolt head 22 tends to eliminate wheel binding during the turning of corners or changes in elevation of the overhead conveyor track.

FIG. 5 shows a front view of the assembled wheel 32 and illustrates a bevelled edge portion 40 which has been found to provide stability of the wheel when riding over the overhead conveyor track. As can be seen in FIG. 5, the end of the head 22 of the bolt 20 includes a hexagonal opening 42 so that a hex wrench can be used for easy assembly and disassembly of the wheel.

An important aspect of the conveyor wheel assembly of the present invention is the type of plastic utilized to form the wheel 32. In the preferred embodiment of the invention, an ultrahigh molecular weight polymer having high abrasion resistance and a low coefficient of friction is desired. Such plastic is self-lubricating and thus does not require periodic maintenance during use. Moreover, the plastic is not subject to excessive wear problems and does not require expensive ball bearing mounting due to its low coefficient of friction.

A material suitable for use in forming the wheel 32 is the plastic manufactured and sold under the trademark "1900 UHMW" by the Hercules Chemical Inc. of Wilmington, Del. Alternatively, an ultra-high molecular weight polymer manufactured and sold under the registered trademark "IMPAX" by Impact Plastics, Inc. of Gastonia, N. C., may also be utilized. The preferred physical characteristics of an ultra-high molecular weight polymer to be utilized for the construction of the wheel 32 are as follows:

Coefficient of Friction—0.11
Hardness, Rockwell (D785)—R45
Specific Gravity—0.945
Cubic Inches Per Pound—29
Maximum Service Temperature
    225 degrees F. (continuous)
    250 degrees F. (intermittently)
Chemical Resistance—highly resistant to all chemicals with the exception of strong oxidizing acids
Abrasion Resistance—unequalled by any other thermoplastic
Tensile Strength—(AT 2 inch Min. as per ASTM D-412, p.s.i.)—6650
FDA Concurrence Schedule—Reg. No. 121.2501

It will thus be seen that the present wheel may be easily installed in place of conventional ball bearing steel wheels. The wheel assembly of the present invention does not require lubrication for continuous operation and is not subject to binding problems, is resistant to shock and abrasion, and has been found to provide long wearing characteristics with little maintenance problems. A further advantage of the present device is that it may be easily sterilized and, thus, may be utilized for such applications as fowl processing and the like.

Having described the invention in connection with certain specific embodiments thereof, it is to be understood that further modifications may now suggest themselves to those skilled in the art and it is intended to cover such modifications as fall within the scope of the appended claims.

What is claimed is:

1. A wheel assembly comprising:
a shaft having a threaded end portion and a conical head,
a ferrule having a hollow cylindrical section for receiving said shaft and having a conical outwardly flared end section for receiving said conical head of said shaft, and
a wheel constructed from a self-lubricating thermoplastic material and including a central opening for receiving said ferrule, said central opening having at one end a conical portion for generally mating with said flared end section of said ferrule, wherein said ferrule acts as a bearing between said shaft and said wheel and also tends to reduce binding of said wheel on said shaft.

2. The wheel assembly of claim 1 wherein said wheel is comprised of ultra-high molecular weight polymer having high abrasion resistance and a low coefficient of friction.

3. The wheel assembly of claim 2 wherein said thermoplastic material has a coefficient of friction of about 0.11 and a specific gravity of about 0.945.

4. A wheel assembly for attachment to an overhead conveyor bracket comprising:
a bolt having a threaded end for being received at one end by the conveyor bracket, said bolt including an outwardly flared conical head;
a ferrule including a cylindrical portion through which said bolt extends and including an outwardly flared conical end portion for receiving said flared bolt head;
a conveyor wheel having a generally cylindrical exterior and having a central opening therethrough dimensioned for receiving said ferrule, said central opening communicating with a conical portion for receiving said conical end portion of said ferrule, wherein said ferrule acts as a bearing between said bolt and said wheel;
said wheel being constructed from self-lubricating plastic having high abrasion resistance and a low coefficient of sliding friction.

5. The wheel assembly of claim 4 wherein said plastic comprises an ultra-high molecular weight polymer and wherein said ferrule is comprised of metal.

6. The wheel assembly of claim 5 wherein said plastic has a coefficient of friction of about 0.11 and a specific gravity of about 0.945.

7. The wheel assembly of claim 4 wherein the end of the head of said bolt has a hex opening therein.

8. The wheel assembly of claim 4 and further comprising:
a nut for connecting said bolt to the conveyor bracket, and
a washer fitting between said wheel and said nut.

* * * * *